(12) United States Patent
Blanchard et al.

(10) Patent No.: US 10,450,966 B2
(45) Date of Patent: Oct. 22, 2019

(54) DEVICE AND METHOD FOR REGULATING A MOTOR USING A THRUST MEASUREMENT

(71) Applicant: SAFRAN AIRCRAFT ENGINES, Paris (FR)

(72) Inventors: Serge Blanchard, Melun (FR); William Bense, Melun (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 832 days.

(21) Appl. No.: 14/956,851

(22) Filed: Dec. 2, 2015

(65) Prior Publication Data
US 2016/0326968 A1     Nov. 10, 2016

(30) Foreign Application Priority Data
Dec. 5, 2014  (FR) .................................... 14 61952

(51) Int. Cl.
*F02C 9/32*  (2006.01)
*F02C 9/28*  (2006.01)
*F02K 3/00*  (2006.01)

(52) U.S. Cl.
CPC .............. *F02C 9/32* (2013.01); *F02C 9/28* (2013.01); *F02C 9/285* (2013.01); *F02K 3/00* (2013.01); *F05D 2270/051* (2013.01); *F05D 2270/44* (2013.01); *F05D 2270/702* (2013.01)

(58) Field of Classification Search
CPC .... F02C 9/32; F02C 9/28; F02C 9/285; F02C 9/44; F05D 2270/304; F05D 2270/331; B64D 27/26; B64D 2027/262; B64D 2027/266; B64D 2027/268
See application file for complete search history.

(56) References Cited

U.S. PATENT DOCUMENTS

| | | | |
|---|---|---|---|
| 6,459,963 B1 * | 10/2002 | Bennett | F02C 9/28 701/14 |
| 8,484,145 B2 | 7/2013 | Lacaille | |
| 8,825,278 B2 | 9/2014 | Bense et al. | |
| 2004/0117102 A1 | 6/2004 | Weir et al. | |

(Continued)

FOREIGN PATENT DOCUMENTS

| | | |
|---|---|---|
| EP | 0 482 250 A1 | 4/1992 |
| EP | 2 376 988 B1 | 7/2013 |
| GB | 2 088 961 | 6/1982 |

OTHER PUBLICATIONS

U.S. Appl. No. 14/781,181, filed Sep. 29, 2015, William Bense et al.

(Continued)

*Primary Examiner* — Andrew H Nguyen
(74) *Attorney, Agent, or Firm* — Oblon, McClelland, Maier & Neustadt, L.L.P.

(57) ABSTRACT

A device for regulating the flow rate of fuel supplied to an aircraft engine, configured to produce a fuel flow rate set value according to a thrust set value supplied by a gas control lever and a measurement of actual thrust of the engine. It extends to a control system including the regulation device and a device for measuring the actual thrust of the engine, to an engine equipped with such a control system, to a regulation method and to a computer program for implementing the method.

10 Claims, 2 Drawing Sheets

(56) References Cited

U.S. PATENT DOCUMENTS

| | | | |
|---|---|---|---|
| 2006/0010972 A1* | 1/2006 | Brown | B64C 19/00 73/178 T |
| 2011/0307431 A1* | 12/2011 | Lacaille | G05B 23/0221 706/17 |
| 2012/0080582 A1* | 4/2012 | Rogero | B64D 27/18 248/554 |
| 2012/0088197 A1* | 4/2012 | Byrd | F02C 9/28 431/2 |
| 2012/0148400 A1 | 6/2012 | Gerez et al. | |

OTHER PUBLICATIONS

French Preliminary Search Report dated Aug. 6, 2015 in French Application 14 61952, filed on Dec. 5, 2014 ( with English translation of categories of Cited Documents).

\* cited by examiner

DEVICE AND METHOD FOR REGULATING A MOTOR USING A THRUST MEASUREMENT

TECHNICAL FIELD

The field of the invention is that of the control of aircraft engines and more particularly that of regulation in particular for acting on the flow rate of fuel brought to an engine according to the required thrust.

PRIOR ART

One method of controlling aircraft engines consists of controlling them for engine speed. The regulation of the engine thus consists of slaving the engine speed to a set speed dependent on the thrust required by the pilot, by action on the flow rate of fuel brought to the engine.

In an engine of the turbojet type with several bodies, for example with a low-pressure body (compressor and turbine) and a high-pressure body, the slaved-speed quantity may be the rotation speed, referred to as N1, of the shaft connecting the low-pressure turbine to the low-pressure compressor and to the fan.

This slaving is based on a model connecting the engine speed to the thrust that was previously determined to suit any engine in the same family.

However, the relationship between engine speed and thrust may be modified by various parameters, such as the ageing of the engine, the maintenance operations to which it has been subjected, or the effect of the manufacturing and installation tolerances. Thus, in practice, the actual engine does not correspond exactly to the "average" engine for which the model was calculated. The result is uncertainties about the relationship connecting engine speed and thrust that require taking into account margin constraints on the engine (robustness to ageing margins, dispersion margins from engine to engine, fouling margins, etc.). The result is that, though the regulation is optimised in general terms for a family of engines, it is not optimised for each engine. However, finer regulation of an engine would make it possible to reduce energy consumption and wear.

One solution would be to modify the model so that the wear parameters of the engine and the dispersions between engines are taken into account. However, this solution would appear to be difficult to implement, since the parameters are numerous and difficult to model.

DISCLOSURE OF THE INVENTION

In order to remedy these drawbacks, the invention proposes a device for regulating the flow rate of fuel supplied to an aircraft engine, characterised in that it is configured to produce a fuel flow rate set value according to a thrust value supplied by a gas control lever and a measurement of actual thrust of the engine.

Certain preferred but non-limitative aspects of this device are as follows:
  it comprises a calculator for computing a fuel flow rate set value configured to produce said fuel flow rate set value from the thrust set value and the measurement of the actual thrust of the engine;
  it comprises a comparator for providing a signal for the difference between the thrust set value and the actual thrust measurement, and the fuel flow rate set value computer produces said fuel flow rate set value from said difference signal;
  it comprises a calculator for computing an engine speed set value configured to produce an engine speed set value from the thrust set value and the measurement of actual thrust, and a circuit computing a fuel flow rate set value configured to produce said fuel flow rate set value from the engine speed set value and a measurement of the actual speed of the engine.

The invention also relates to a system for controlling an aircraft engine, comprising a regulation device according to the invention and a device for measuring the actual thrust of the engine, for example via a measurement of deformation of a thrust force absorption device interposed between the engine and the aircraft, supplying said measurement of actual thrust of the engine to the regulation device.

BRIEF DESCRIPTION OF THE DRAWINGS

Other aspects, aims, advantages and features of the invention will emerge more clearly from a reading of the following detailed description or preferred embodiments thereof, given by way of non-limitative example and made with reference to the accompanying drawings, wherein.

DETAILED DISCLOSURE OF PARTICULAR EMBODIMENTS

The invention relates to a device for regulating the flow rate of fuel supplied to an aircraft engine in order to achieve the thrust required by the pilot of the aircraft.

Figure 1:
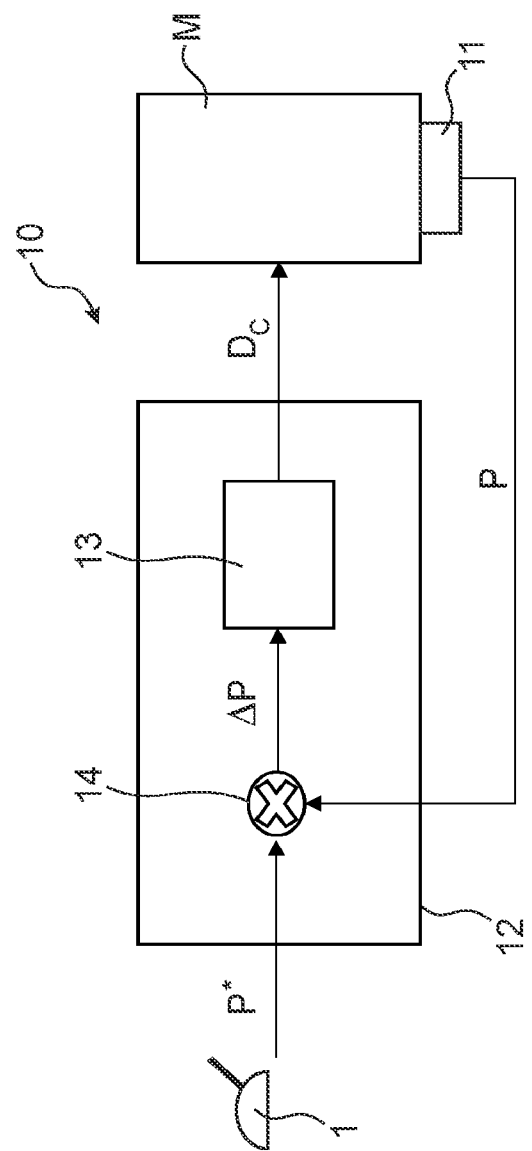
FIG. 1 is a diagram of a control system according to a first embodiment of the invention.
Figure 2:
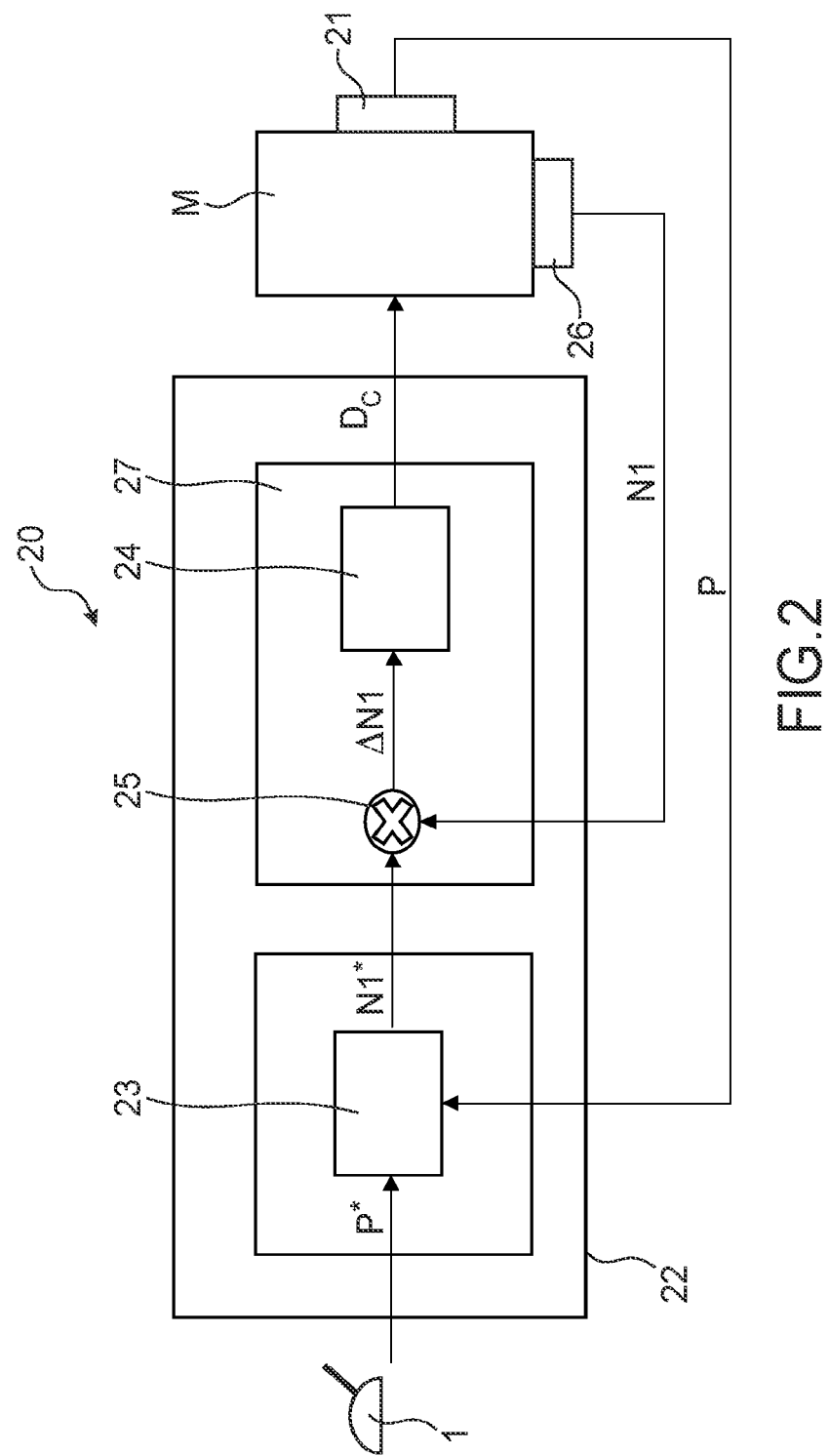
FIG. 2 is a diagram of a control system according to a second embodiment of the invention.

With reference to FIGS. 1 and 2, which illustrate two possible embodiments of a fuel flow rate regulation device according to the invention, such a regulation device 12, 22 receives thrust set value information P* supplied by a gas control lever 1 manoeuvred by the pilot (for example information expressed in the form of an angle of the gas lever) and produces a fuel flow rate set value Dc that makes it possible to control a metering unit associated with the engine M.

The invention also relates to a control system 10, 20 incorporating the regulation device 12, 22, and which moreover comprises a device 11, 21 for measuring the actual thrust of the engine M. This measurement of actual thrust P is returned to the regulation device 12, 22, which is configured to produce the fuel flow rate set value Dc according to the thrust set value P* and the measurement of actual thrust P.

In a first embodiment depicted in FIG. 1, the engine is directly controlled for thrust. Thus, instead of slaving the engine speed to a set speed dependent on the thrust required by the pilot, in this embodiment the thrust of the engine is slaved to the set thrust value.

As depicted in FIG. 1, the regulation device 12 of the control system 10 then comprises a fuel flow rate set value calculator 13 configured to produce said fuel flow rate set value Dc from the thrust set value P* and the measurement of the actual thrust P of the engine.

The regulation device 12 may in particular comprise a comparator 14 able to provide a signal of the difference ΔP between the thrust set value P* and the actual thrust measurement P. The fuel flow rate set value calculator 13 is then configured to produce the fuel flow rate set value Dc from said difference signal ΔP.

Where the engine speed regulation device of the prior art uses a signal for the difference between set speed and actual speed in order to produce the fuel flow rate set value Dc, the invention in this first embodiment uses the same regulation laws but with thrust instead of engine speed. This first embodiment requires the thrust measurement device 11 to produce a measurement of the actual thrust P continuously and in real time.

In a second embodiment depicted in FIG. 2, the engine is still controlled for speed, but a loop returning the actual thrust measurement is added, which makes it possible to effect an adjustment of the speed regulation.

As shown in FIG. 2, the regulation device 22 comprises a fuel flow rate set value calculator circuit 27 configured to produce said fuel flow rate set value Dc from the engine speed set value N1* and a measurement of the actual speed of the engine N1 produced by means of a sensor 26.

The calculator circuit 27 may in particular comprise a comparator 25 able to provide a signal ΔN1 for the difference between the speed set value N1* and the actual speed measurement N1. The calculator circuit 27 further comprises a fuel flow rate set value calculator 24 configured to produce the fuel flow rate set value Dc from said difference signal ΔN1.

The regulation device 22 moreover comprises an engine speed set value calculator 23 configured to produce the engine speed set value N1* from the thrust set value P* and the actual thrust measurement P. This calculator 23 uses a model connecting the thrust set value P* to the engine speed set value N1*, the actual thrust measurement P being used to adjust this model. The model may be a theoretical model or a model determined on the test bench. It may be adjusted from one flight to another in order to take account of the ageing of the engine.

This second embodiment does not require the thrust measurement device 21 to produce a measurement of the actual thrust P continuously or in real time. Isolated measurements of the actual thrust P may in fact suffice to provide a correction factor to the model. The engine speed set value calculator 23 can thus be configured to use isolated measurements of the actual thrust P in order to effect an isolated adjustment of the model linking engine speed and thrust.

The actual thrust measurements used for correcting the engine speed set value N1* preferably correspond to measurements that are not dependent on the external context, for example measurements carried out when the attitudes of the aircraft do not vary (full speed on the ground, or landing after the wheels touch down).

This second embodiment has the advantage that only a correction factor on the engine speed regulation and the thrust/engine speed relationship is produced, the major regulation principles remaining unchanged. Moreover, only an acquisition of a few isolated measurements per flight is necessary. Furthermore, this second embodiment is robust vis-à-vis disturbances that might cause temporary loss of the actual thrust information measured by the thrust measurement device 21. This is because, since the adjustment action is not continuous but at isolated points, the risk of loss of information is limited. Moreover, in the event of non-availability of an isolated measurement, the adjustment may be made with the previous actual thrust measurement or may also not be carried out so that the regulation is then implemented in accordance with normal operation. The safety of the aircraft is therefore not affected by the temporary loss of the actual thrust information.

In either of the embodiments described above, the regulation device 12, 22 may also comprise a module (not shown) for standardising the measurements of the device for measuring the actual thrust of the engine 11, 21, configured so as to eliminate the dependency of said measurements vis-à-vis the external context.

The raw actual thrust measurements made in flight are in fact influenced by the acquisition conditions (piloting, weather, path, state of the engine, etc.), and it is preferable to standardise them in order to extract the useful information. By way of example of a standardisation method that may be used in the context of the invention, reference can in particular be made to the patent EP 2 376 988 B1. The aircraft attitudes issuing from an inertial unit may in particular be used as data representing the external context.

In both of the embodiments described above, the device for measuring the actual thrust of the engine 11, 21 may be configured so as to make a measurement of deformation of a thrust force absorption device interposed between the engine and the aircraft.

Such a thrust force absorption device typically comprises at least one connecting rod, the deformation of which depends on the traction/compression forces being that pass therein, the forces mainly due to thrust. The device for measuring the actual thrust of the engine 11, 21 may comprise at least one deformation sensor arranged on at least one connecting link, for example a strain gauge, a device with so-called "Belleville" spring washers, or a Bragg grating sensor to measure perturbation in an optical signal in case of deformation. Other examples of deformation sensor include a Lamb waves sensor to measure perturbation due to deformation in the propagation of surface waves produced by a piezoelectric actuator along the connecting rod, a camera capable to detect a deformation of a pattern covering the surface of the connecting rod, or a laser capable of measuring the deviation between targets arranged on the connecting rod. The deformation sensor may be a wireless sensor able to return the actual thrust measurement information to the regulation device 12, 22 over a wireless communication link.

The invention is not limited to the regulation device and to the control system as described previously but also extends to the engine equipped with such a control system as well as the regulation method used by such a regulation device, and in particular to a method comprising the steps of:
  acquiring a measurement of actual thrust of the engine; and
  producing a fuel flow rate set value Dc according to a thrust set value P* supplied by a gas control lever 1 and the measurement of actual thrust of the engine P.

The invention also relates to a computer program comprising code instructions for implementing the regulation method when said program is executed on a computer.

The invention claimed is:
1. A device for regulating a flow rate of fuel supplied to an engine in an aircraft, comprising:
  an engine speed set value calculator configured to produce an engine speed set value from a thrust set value supplied by a gas control lever, based on a model linking the thrust set value to the engine speed set value, and
  a fuel flow rate set value circuit configured to:
    produce a fuel flow rate set value from the engine speed set value and a measurement of an actual speed of the engine, and
    control a metering unit of the engine based on said fuel flow rate set value so as to regulate the flow rate of fuel supplied to the engine, wherein the engine speed set value calculator is configured to provide a correction factor to the model linking the thrust set value to the engine speed set value based on non-continuous measurements of actual thrust provided by an actual thrust measuring device configured to make measurements of deformation of a thrust forces absorbing device interposed between the engine and the aircraft, and wherein the correction factor modifies the model based on the measurements of actual thrust.

2. The device according to claim 1, wherein the non-continuous measurements of actual thrust are made when attitudes of the aircraft do not vary.

3. The device according to claim 1, wherein the device is further configured to standardize the actual thrust measurements of the engine to eliminate dependency of said actual thrust measurements vis-a-vis an external context.

4. The device according to claim 3, wherein attitude data supplied by an inertial unit is used as data representing the external context.

5. A system for controlling an aircraft engine, comprising a regulation device according to claim 1, wherein the actual thrust measuring device supplies supplying said measurements of actual thrust of the engine to the regulation device.

6. The system according to claim 5, wherein the thrust forces absorbing device comprises at least one connecting rod and wherein the actual thrust measuring device of the engine comprises at least one deformation sensor arranged on the at least one connecting rod.

7. An aircraft engine equipped with a control system according to claim 5.

8. A method for regulating a flow rate of fuel supplied to an engine in an aircraft, comprising:
producing an engine speed set value from a thrust set value supplied by a gas control lever, based on a model linking the thrust set value to the engine speed set value;
producing a fuel flow rate set value from the engine speed set value and a measurement of an actual speed of the engine; and
controlling a metering unit of the engine based on said fuel flow rate set value so as to regulate the flow rate of fuel supplied to the engine,
wherein a correction factor is provided to the model linking the thrust set value to the engine speed set value based on non-continuous measurements of actual thrust provided by an actual thrust measuring device configured to make measurements of deformation of a thrust forces absorbing device interposed between the engine and the aircraft, and
wherein the correction factor modifies the model based on the measurements of actual thrust.

9. A non-transitory computer readable medium including a computer program comprising code instructions for implementing a method of regulating a flow rate of fuel supplied to an engine in an aircraft when said program is executed on a computer, said method comprising:
producing an engine speed set value from a thrust set value, based on a model linking the thrust set value to the engine speed set value;
producing a fuel flow rate set value from the engine speed set value and a measurement of an actual speed of the engine;
providing a correction factor to the model linking the thrust set value to the engine speed set value based on non-continuous measurements of actual thrust provided by an actual thrust measuring device configured to make measurements of deformation of a thrust forces absorbing device interposed between the engine and the aircraft; and
controlling a metering unit of the engine based on said fuel flow rate set value so as to regulate the flow rate of fuel supplied to the engine,
wherein the correction factor modifies the model based on the measurements of actual thrust.

10. The device according to claim 1, wherein the actual thrust measuring device includes a deformation sensor provided on a connecting link.

* * * * *

UNITED STATES PATENT AND TRADEMARK OFFICE
CERTIFICATE OF CORRECTION

PATENT NO. : 10,450,966 B2
APPLICATION NO. : 14/956851
DATED : October 22, 2019
INVENTOR(S) : Serge Blanchard et al.

Page 1 of 1

It is certified that error appears in the above-identified patent and that said Letters Patent is hereby corrected as shown below:

In the Claims

Column 5, Line 23, Claim 5 change "supplies supplying said" to --supplies said--.

Signed and Sealed this
Twenty-fourth Day of March, 2020

Andrei Iancu
*Director of the United States Patent and Trademark Office*